June 29, 1926.

J. N. BANKS 1,590,796

FILM EXPOSING DEVELOPING AND FINISHING APPARATUS OF PHOTOGRAPHIC
TYPOGRAPHICAL COMPOSING MACHINES

Filed Sept. 24, 1924   3 Sheets-Sheet 1

Inventor.
John Nelson Banks
By Rogers, Kennedy Campbell
Attorneys

J. N. BANKS

FILM EXPOSING DEVELOPING AND FINISHING APPARATUS OF PHOTOGRAPHIC
TYPOGRAPHICAL COMPOSING MACHINES

Filed Sept. 24, 1924   3 Sheets-Sheet 3

1,590,796

Inventor.
John Nelson Banks
By Rogers, Kennedy Campbell
Attorneys

Patented June 29, 1926.

1,590,796

UNITED STATES PATENT OFFICE.

JOHN NELSON BANKS, OF LONDON, ENGLAND, ASSIGNOR TO LINOTYPE AND MACHINERY LIMITED, OF LONDON, ENGLAND, A BRITISH COMPANY.

FILM EXPOSING, DEVELOPING, AND FINISHING APPARATUS OF PHOTOGRAPHIC TYPOGRAPHICAL COMPOSING MACHINES.

Application filed September 24, 1924, Serial No. 739,463, and in Great Britain September 29, 1923.

This invention relates to photographic typographical composing machines in which the composed characters are photographed on to a sensitized film, and it has for its object to provide for this purpose a photographic apparatus of the kind wherein the film may be successively exposed, developed, fixed, washed, and dried in one continuous course through the machine, and from which the film may be delivered ready for the subsequent process in which it is to be employed. The object of this invention is to adapt apparatus of this kind to the particular requirements of photographic typographical composing machines. With this object in view, the present invention provides, in combination with a camera, chambers in which a film is developed, fixed, washed and dried, mechanism for advancing a film intermittently through the camera, and continuously operable mechanism for conveying a length of film through the said chambers, an actuating device for the intermittent film-advancing mechanism, which is adapted to be intermittently operated by a member of the composing machine which is automatically actuated after exposure of a line of characters. Further features of the invention consist in the provision of means whereby the intermittent film-advancing mechanism may be actuated independently of the intermittently operated actuating device, and in the provision of an intermediate conveyor controlling the passage of the film between the camera and the continuously operable mechanism, which may be alternatively operated either by the intermittently operated actuating device or by the continuously operable mechanism, the arrangement being such that the film may be advanced through the camera by the action of the intermittently operated actuating device while the intermediate conveyor is under the control of the continuously operable mechanism.

The invention is particularly applicable to machines in which elements bearing the characters to be reproduced are assembled in lines and wherein a separate exposure is made for each composed line, the film being advanced columnwise between each exposure, and for that reason a constructional form of the invention suitable for such application is chosen for description herein, and is illustrated in the accompanying drawings.

In said drawings:—

Figures 1 and 1ª together form a side elevation, partly diagrammatic, showing the general arrangement of the apparatus according to the said constructional form;

Figure 5:
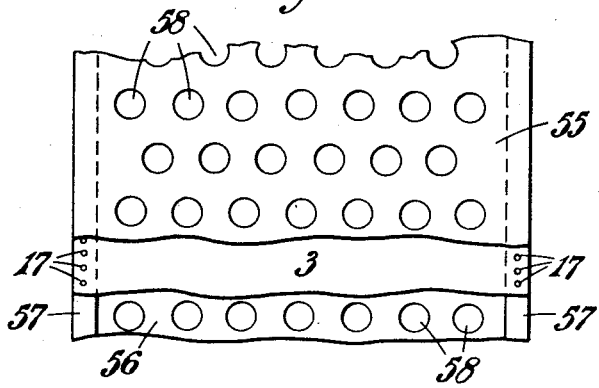
Figure 6:
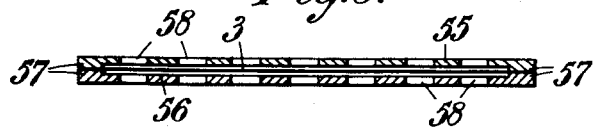

Figures 5 and 6 respectively a plan and sectional view illustrating one form of the film-conveying bands.

In carrying out the invention in connection with a machine such as those above particularized, the desired step by step movement of the film through the camera may be effected by mechanism automatically brought into operation when the assembled line is moved either to or from the exposure position, in a manner similar to that in which the casting mechanism is operated in machines which produce a cast type-bar from an assembled line of matrices.

Referring first to the general arrangement of the said constructional form, illustrated in Figures 1 and 1ª, the apparatus comprises a camera 1, a detachable film box 2 accommodating the film 3 and part of the film-advancing mechanism, a box 4 containing film guides and a film conveyor, (hereinafter termed the intermediate conveyor), and on which is mounted mechanism for intermittently advancing the film, a developing chamber 5, a fixing chamber 6, a washing chamber 7 and drying apparatus 8, the film box 2, conveyor box 4, and chambers 5, 6, 7, being in light-tight connection with the camera and with each other.

The camera 1 may be of any suitable form, having an aperture or slot 9 through which the image of the composed line is projected on to the film 3. The aperture 9 is preferably adjustable for dealing with composition in fonts of different sizes, and for this purpose is constituted by two shutters 10 mounted in guides in the camera casing and movable towards and away from each other by means not shown in the drawings.

Figure 4:
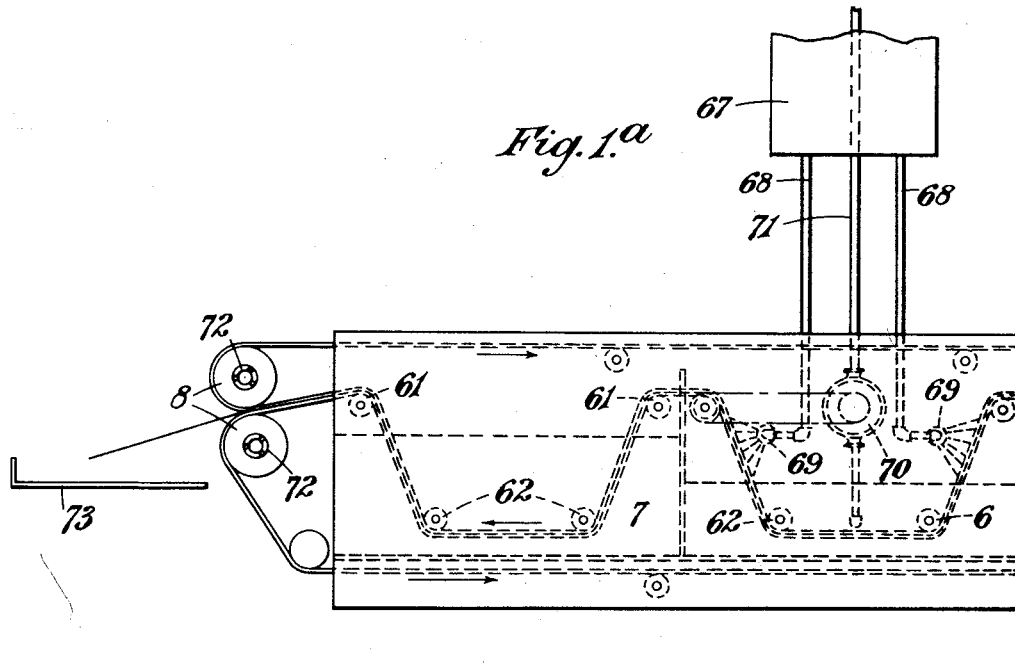
Figure 4 is a detail view of the film-advancing rollers.
Figure 4:
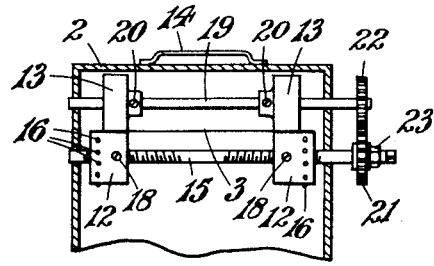

The film box 2 carries the film spool 11 and film advancing rollers 12, 13 (Figure 4), and is slidable in guides on the rear of the camera casing and on the adjacent end of the box 4 so that it can be removed, by the handle 14, for inserting or changing the films. To enable the apparatus to deal with films of different widths, the rollers 12, 13, are constructed as illustrated particularly in Figure 4, from which it will be seen that the spindle 15 of the rollers 12 has right- and left-hand screw threaded portions on which the respective rollers are mounted, so that by turning the spindle 15 while holding the rollers 12 against rotation, the latter may be moved towards and away from each other, and their pins 16 brought into correct position for engaging the marginal perforations 17 of any film which it is desired to use, set-screws 18 being provided to prevent accidental rotation of the rollers on the spindle 15. The rollers 13 are adjustable along their spindle 19, and are secured by set screws 20 in the desired position, just clear of the pins 16 on the rollers 12 so as to hold the film in engagement with those pins. Intermittent motion is imparted to the rollers 12, 13, by mechanism hereinafter described, through gear wheels 21, 22 mounted on the spindles 15, 19 respectively, and to permit the spindle 15 to be turned for adjusting the rollers 12 as above-mentioned, independently of the gear wheel 21, the latter is secured to the spindle by a lock nut 23 and the spindle-end is squared or otherwise adapted to be turned by a key or spanner.

Figure 2:
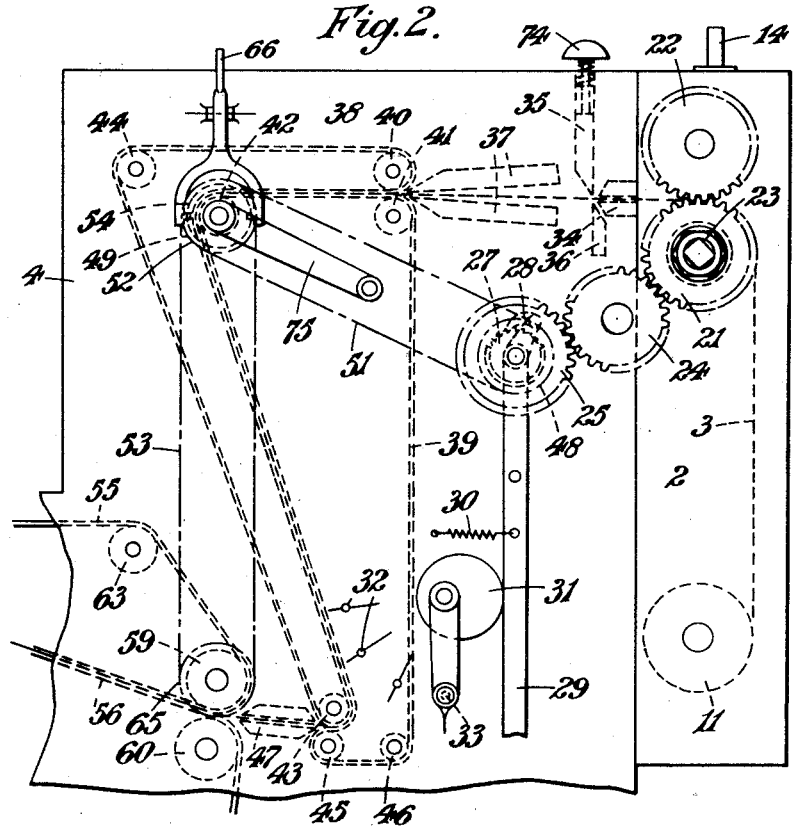
Figure 2 is a side elevation of part of the apparatus represented in Figure 1, drawn to a larger scale than that figure.
Figure 3:
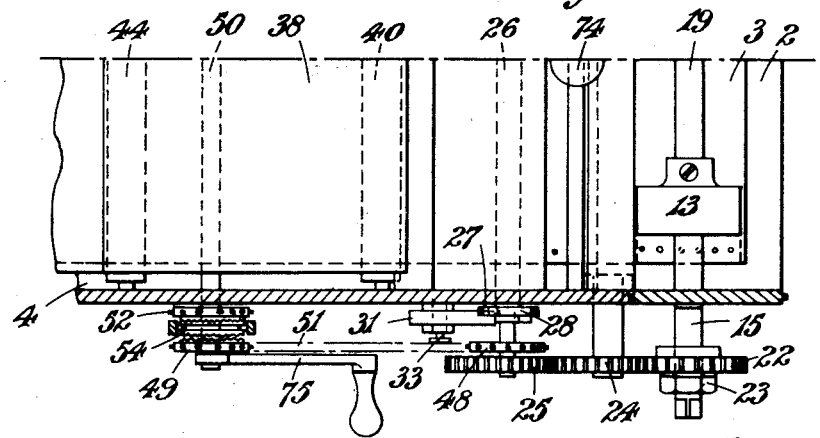
Figure 3 is a half plan of Figure 2.

The intermittently actuated film-advancing mechanism according to the invention is carried by the box 4 as illustrated more particularly in Figures 2 and 3. It comprises an intermediate gear 24 meshing with the gear 21 and with a driven gear 25 on a shaft 26 rotatably mounted in the side walls of the box 4. The shaft 26 has secured to it a ratchet disc 27 engaged by a pawl 28 carried at one end of a lever 29 pivoted on the side wall of the box 4, the other end of the lever 29 being in a position to be engaged by a member of the composing machine (not shown in the drawings) which is actuated on, or at an appropriate period after, the completion of the composition of each line. The extent to which the film is advanced by each actuation of the lever 29 should be variable, to permit line spacing appropriate to different fonts, and for this purpose the free arm of the lever 29 is held by a spring 30 against an adjustable stop which limits the inoperative stroke of the lever.

In the example shown the stop is in the form of an eccentric 31, the positions of which appropriate to different fonts being defined by depressions 32 in the side wall of the box 4 and a spring plunger 33 carried by the setting lever. The rollers 12, 13, advance the film, between guide plates 34, film-cutting blades 35, 36 and guide plates 37, into engagement with the conveying mechanism in the box 4.

The intermediate conveyor in the box 4 consists of two endless bands 38, 39 similar to the perforated bands hereinafter described with reference to Figures 5 and 6, and guide rollers numbered 40 to 46 around which the bands are guided. It will be noted that both bands pass between rollers 40 and 41, over roller 42 and between rollers 43 and 45, travelling in the directions indicated by the arrows in Figure 1 with their raised marginal portions in contact, thus gripping the film as it is fed between rollers 40 and 41 and passing it out between rollers 43, 45 where it is conducted through guides 47 to the conveyors for the developing and other chambers. The intermediate conveyor just described is driven intermittently by the action of the lever 29 through (as shown best in Figure 3) a sprocket 48 on the shaft 26, a sprocket 49 loose on the shaft 50 of the roller 42, and chain 51. On the shaft 50 there is loosely mounted a second sprocket 52 which is geared by a chain 53, to mechanism hereinafter described, for continuously conveying the film through the developing, fixing and washing chambers. Splined to the shaft 50 between the two sprockets 49, 52 is a double clutch member 54, by means of which the drive of the intermediate conveyor in the box 4 may, when desired, be placed under the control of either the lever 29 for intermittent operation, or the continuously operating mechanism.

The film is conducted by the guides 47 into engagement with a pair of endless bands 55, 56, which grip the edges of the film between their raised edge portions 57, and are provided with perforations 58 (see Figures 5 and 6) to permit free access of the developing, fixing and washing fluids to the film as it is conveyed through the respective chambers. These bands 55, 56, are driven continuously, for example by a motor, through gears on the shafts of guide rollers 59, 60, pass over upper guide rollers 61, and lower guide rollers 62 in the respective chambers, and thence are diverted round the drying drums 8 back to guide rollers 63, 59 and 64, 60 respectively. The various guide rollers are adjustable on their respective shafts, preferably as hereinbefore described with reference to the rollers 13, to allow for films of different widths.

The shaft of the continuously driven roller 59 has fast on it a sprocket 65 for the chain 53 above referred to, connecting the two sets of film-conveying bands, and enabling the set in box 4 to be continuously driven when the clutch 54 on the shaft 50 is engaged with the sprocket 52. A forked lever 66 is provided for moving the clutch 54 into engagement with either of the sprockets 49, 52, according to whether intermittent or continuous drive of the bands 38, 39 is required.

Figure 1:
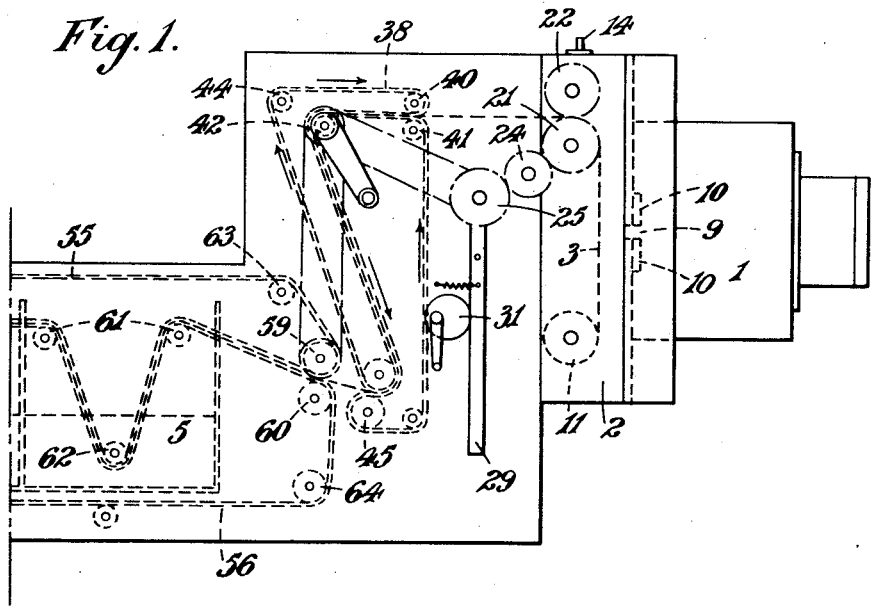

In order to expedite the action of the respective fluids on the film a circulating system and spraying devices, as illustrated in Figure 1ª in connection with the fixing chamber 6, may be applied to any or all of the chambers 5, 6, 7. According to the arrangement shown, the fixing solution is contained in a supply tank 67, and passes through feed pipes 68 therefrom to spraying devices 69, by which it is caused to impinge on to the sensitized surface of the film through the perforations 58 of the band 55, a rotary pump 70 suitably geared to the driving mechanism of the bands 55, 56, and a return pipe 71 being provided to return the fluid from the chamber to the supply tank. The time occupied by the film in traversing each chamber may be determined by the arrangement of the guide rollers and the speed of the bands so that effective action of the respective fluids on the film is assured.

The process is completed by the passage of the film through the drying apparatus, which consists of perforated drums 8 covered with absorbent material and internally heated, for example, by gas jets 72, and the delivery of the film into a tray 73.

In the operation of the apparatus, after each composed line has been exposed, the film 3 is advanced by the actuation of the lever 29, and when the composition of all the lines of the "take" is completed, the film is advanced by turning a handle 75 on the shaft 50 until the last exposed portion of the film has passed the knives 35, 36, the clutch 54 being at this stage of the operation, in engagement with the sprocket 49. The movable knife 35 is then depressed by means of the knob 74 and the exposed portion of the film severed from the unexposed part. The clutch 54 is then moved into engagement with the sprocket 52 so as to place the passage of the film through the remainder of the apparatus under the control of the continuous conveying mechanism. In the meantime, the exposure of the first lines of next "take" may be proceeded with, and before the film has been advanced sufficiently to engage the rollers 40, 41, the delivery of the first portion of the film will have been completed and the clutch 54 can be again engaged with the sprocket 49.

Having described my invention, I declare that what I claim and desire to secure by Letters Patent is:—

1. In or for a photographic typographical composing machine, the combination with photographic apparatus comprising a camera, developing, fixing and washing chambers, mechanism adapted to convey a sensitized film through the camera and mechanism adapted to convey a length of film through the chambers, of an intermediate conveyor adapted to control the passage of the film between the camera and the chambers, and a device operable by a member of the composing machine actuated after exposure of a line of characters, adapted to intermittently actuate the camera film-conveying mechanism.

2. In or for a photographic typographical composing machine, the combination with photographic apparatus comprising a camera, developing, fixing and washing chambers, mechanism adapted to convey a sensitized film through the camera and mechanism adapted to convey a length of film through the chambers, of an intermediate conveyor adapted to control the passage of the film between the camera and the chambers, and a device operable by a member of the composing machine actuated after exposure of a line of characters, adapted to intermittently actuate both the camera film-conveying mechanism and the intermediate conveyor.

3. In or for a photographic typographical composing machine, the combination with photographic apparatus comprising a camera, developing, fixing and washing chambers, mechanism adapted to convey a sensitized film through the camera and mechanism adapted to convey a length of film through the chambers, of an intermediate conveyor adapted to control the passage of the film between the camera and the chambers, a device operable by a member of the composing machine actuated after exposure of a line of characters, adapted to intermittently actuate both the camera film-conveying mechanism and the intermediate conveyor and means adapted to actuate both the camera film-conveying mechanism and the intermediate conveyor independently of the said device.

4. In or for a photographic typographical composing machine, the combination with photographic apparatus comprising a camera, developing, fixing and washing chambers, mechanism adapted to convey a sensitized film through the camera and mechanism adapted to convey a length of film through the chambers, of an intermediate conveyor adapted to control the passage of the film between the camera and the chambers, a device operable by a member of the composing machine actuated after exposure of a line of characters, adapted to intermittently actuate the camera film-conveying mechanism and means adapted to vary the extent to which the film is moved through the camera at each intermittent actuation.

5. In or for a photographic typographical composing machine, the combination with photographic apparatus comprising a camera, developing, fixing and washing chambers, mechanism adapted to convey a sensitized film through the camera and mechanism adapted to convey a length of film through the chambers, of an intermediate conveyor adapted to control the passage of the film between the camera and the chambers, a device operable by a member of the composing machine actuated after exposure of a line of characters, adapted to intermittently actuate both the camera film-conveying mechanism and the intermediate conveyor and means adapted to vary the extent to which the film is moved at each such intermittent actuation.

6. In or for a photographic typographical composing machine, the combination with photographic apparatus comprising a camera, developing, fixing and washing chambers, mechanism adapted to convey a sensitized film through the camera and continuously operating mechanism adapted to convey a length of film through the chambers, of an intermediate conveyor adapted to control the passage of the film between the camera and the chambers, a device operable by a member of the composing machine actuated after exposure of a line of characters, adapted to intermittently actuate both the camera film-conveying mechanism and the intermediate conveyor and means adapted to transfer the control of the intermediate conveyor from the intermittent actuating device to the continuously operating mechanism.

7. In or for a photographic typographical composing machine, the combination with photographic apparatus comprising a camera, developing, fixing and washing chambers, mechanism adapted to convey a sensitized film through the camera and continuously operating mechanism adapted to convey a length of film through the chambers, of an intermediate conveyor adapted to control the passage of the film between the camera and the chambers, a device operable by a member of the composing machine actuated after exposure of a line of characters, adapted to intermittently actuate both the camera film-conveying mechanism and the intermediate conveyor, means operable to sever an exposed length of film at a point between the camera and the intermediate conveyor, and means adapted to transfer the control of the intermediate conveyor from the intermittent actuating device to the continuously operating mechanism while permitting the continued intermittent actuation of the camera film-conveying mechanism.

In testimony whereof I have affixed my signature hereto.

JOHN NELSON BANKS.